(12) United States Patent
Yamamoto et al.

(10) Patent No.: US 10,054,087 B2
(45) Date of Patent: Aug. 21, 2018

(54) SADDLE VEHICLE (71) Applicant: KAWASAKI JUKOGYO KABUSHIKI KAISHA, Hyogo (JP)

(72) Inventors: Shigeki Yamamoto, Akashi (JP); Shigeyuki Iwata, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 15/358,484

(22) Filed: Nov. 22, 2016

(65) Prior Publication Data
US 2017/0152821 A1 Jun. 1, 2017

(30) Foreign Application Priority Data
Nov. 27, 2015 (JP) .................. 2015-231279

(51) Int. Cl.
| | |
|---|---|
| *B60K 7/00* | (2006.01) |
| *F02M 35/16* | (2006.01) |
| *B62K 11/04* | (2006.01) |
| *B62J 35/00* | (2006.01) |
| *B62J 15/00* | (2006.01) |
| *F02M 35/024* | (2006.01) |

(52) U.S. Cl.
CPC ............ *F02M 35/162* (2013.01); *B62J 15/00* (2013.01); *B62J 35/00* (2013.01); *B62K 11/04* (2013.01); *F02M 35/024* (2013.01); *B60Y 2304/05* (2013.01); *B60Y 2410/122* (2013.01)

(58) Field of Classification Search
CPC ....... F02M 35/14; F02M 35/162; B62K 11/04
USPC .................................. 180/218, 219
See application file for complete search history.

(56) References Cited

U.S. PATENT DOCUMENTS

| | | | |
|---|---|---|---|
| 7,331,593 B2* | 2/2008 | Okabe .................. | B62J 1/12 180/219 |
| 7,431,114 B2* | 10/2008 | Ohira ................. | B62K 19/46 180/219 |
| 2002/0040699 A1* | 4/2002 | Yokoyama ............ | B62K 11/04 123/184.21 |
| 2005/0133289 A1* | 6/2005 | Nakano ................ | F02M 35/048 180/219 |

FOREIGN PATENT DOCUMENTS

JP 2009-161014 7/2009

* cited by examiner

*Primary Examiner* — Tony H Winner
(74) *Attorney, Agent, or Firm* — Wenderoth, Lind & Ponack, L.L.P.

(57) ABSTRACT

A saddle vehicle includes an engine that is between a front wheel and a rear wheel and is mounted on a vehicle frame. The saddle vehicle includes: a rear fender at least partially covering the rear wheel from above; and an air cleaner between the rear fender and the engine; wherein the air cleaner is fixed to the rear fender.

6 Claims, 5 Drawing Sheets

SADDLE VEHICLE

BACKGROUND OF THE INVENTION

Technical Field

This invention relates to a structure fixing an air cleaner disposed behind an engine in a saddle type vehicle.

Related Art

A motorcycle according to an aspect of such a saddle type vehicle includes an air cleaner that is typically disposed behind an engine. For example, a motorcycle disclosed in JP 2009-161014 A1 includes a vehicle frame (back stay) provided with a bracket to which an air cleaner and a rear fender are fixed by bolts.

The air cleaner and the rear fender of the motorcycle mentioned above have a relative positional relation that may be varied due to an assembly error or a dimensional error of the frame.

SUMMARY

This invention has been achieved in view of this problem, and an object of the invention is to provide a technique for inhibiting positional variation between an air cleaner and a rear fender.

According to an aspect of this invention, a saddle type vehicle includes an engine that is disposed between front and rear wheels and is mounted on a vehicle frame. The vehicle includes: a rear fender at least partially covering the rear wheel from above; and an air cleaner disposed between the rear fender and the engine; and the air cleaner is fixed to the rear fender.

In the configuration according to aspect of the invention, the air cleaner is disposed between the rear fender and the engine, and the air cleaner and the rear fender disposed adjacent to each other are fixed directly to each other. This achieves a fixed positional relation between the two members, and prevents influence by a frame error to inhibit positional variation between the air cleaner and the rear fender.

Optionally, the rear fender is molded integrally with a fixed portion for fixation of the air cleaner, and the air cleaner is detachably fixed to the fixed portion. This achieves reduction in the number of locations welded to the vehicle frame and reduction in production cost in comparison to a conventional technique of welding, to a vehicle frame, an air cleaner fixing bracket (corresponding to a "fixed portion" according to the present invention).

Optionally, the rear fender is made of a resin material. This achieves the following functional effects. A saddle type vehicle inevitably generates vibration to be transmitted also to an air cleaner via a rear fender. A rear fender made of a resin material attenuates vibration transmitted from a vehicle frame. This inhibits vibration transmitted to the air cleaner to prevent vibration of the air cleaner.

Optionally, the vehicle further includes: a support member attached to the vehicle frame and disposed vertically below the air cleaner fixed to the rear fender, and the air cleaner has a bottom supported by the support member with a shock absorbing member interposed therebetween. In this configuration, the air cleaner is fixed to the rear fender and has the bottom supported by the support member. The configuration disperses a load applied to the air cleaner and achieves stable fixation of the air cleaner without excessive rigidity of an air cleaner fixing portion provided at the rear fender.

Optionally, the saddle type vehicle further includes a restricting member disposed above the air cleaner and configured to restrict upward displacement of the air cleaner, in order for further improvement in fixing stability of the air cleaner.

In a case where the saddle type vehicle includes a fuel tank reserving fuel of the engine, desirably, further includes a labyrinth structure ahead of an intake port of the air cleaner. The labyrinth structure includes a first wall projecting downward from a lower surface of the tank and a second wall projecting upward from an upper surface of the air cleaner, and the labyrinth structure is configured to reverse fluid flowing from ahead between the lower surface of the tank and the upper surface of the air cleaner. The following are reasons therefor. In the above configuration according to the invention, there is a space between the tank and the air cleaner. Fluid containing rainwater, muddy water, or the like may flow toward the intake port of the air cleaner through the space. The labyrinth structure, however, reverses the fluid at a position upstream of the intake port of the air cleaner to prevent the fluid from reaching the intake port. Rainwater, muddy water, or the like is thus effectively prevented from entering the air cleaner through the intake port. Furthermore, provision of the labyrinth structure at part of the fuel tank will achieve reduction in the number of components in comparison to a case of providing a dedicated member.

In a case where the saddle type vehicle includes the vehicle frame having a pair of left and right frames, the air cleaner is desirably configured to be installed and detached near the rear wheel to and from an accommodation space expanding below the pair of left and right frames, and have a maximum lateral width larger than a distance between the pair of left and right frames. The vehicle frame is provided with no bracket for the air cleaner, so that the air cleaner is easily inserted from behind to the accommodation space while interference of the air cleaner with the pair of left and right frames is prevented. Furthermore, the maximum lateral width is larger than the distance between the pair of left and right frames to achieve increase in body capacity of the air cleaner.

In a case where the air cleaner includes a cleaner container having a filter accommodating portion accommodating a filter element, and an opening provided in an upper surface of the cleaner container and allowing the filter element to be installed to and detached from the filter accommodating portion, the filter element is installed to and detached from the filter accommodating portion through a gap between the pair of left and right frames, the saddle type vehicle desirably has the following configuration. In order for increase in body capacity of the air cleaner, preferably, the cleaner container has an interior partitioned by the filter element inserted to the filter accommodating portion, into an introduction space for intake air and a guide space guiding intake air having passed through the filter element toward the engine, and in a planar view from vertically above in a state where the air cleaner is fixed to the rear fender, the cleaner container has a wall including a wall portion that corresponds to the filter accommodating portion and is sunk laterally inward from wall portions corresponding to the introduction space and the guide space.

As described above, the air cleaner according to the present invention is fixed directly to the rear fender to inhibit positional variation between the air cleaner and the rear fender.

BRIEF DESCRIPTION OF THE DRAWINGS

The above and other features of the present invention will be apparent from the following description of exemplary embodiments of the present invention and drawings, in which.

DETAILED DESCRIPTION OF EMBODIMENTS

Figure 1A:
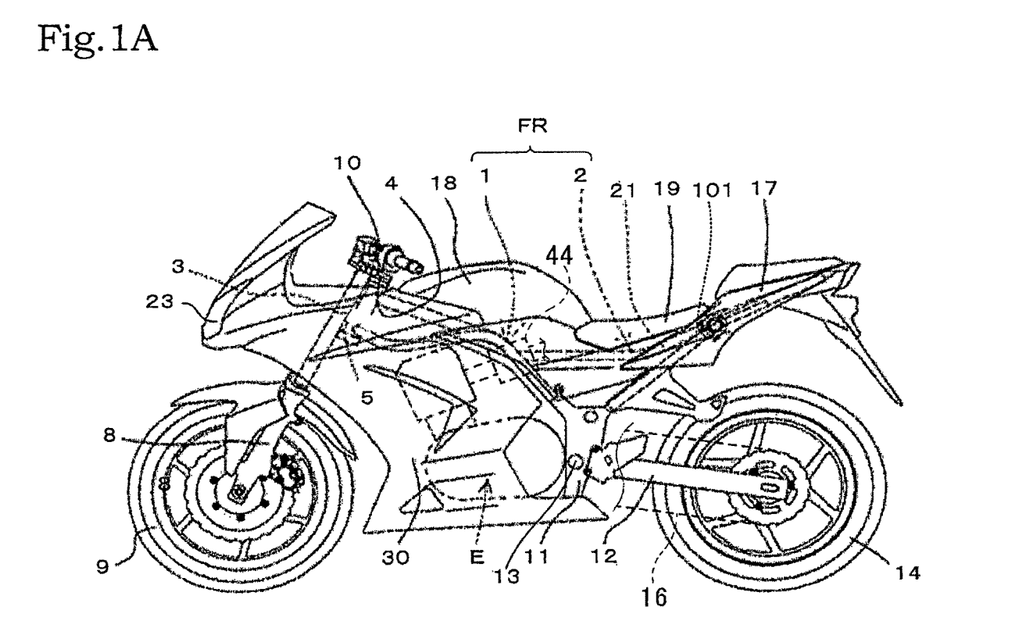
FIG. 1A is a left side view of a motorcycle as a saddle type vehicle according to an embodiment of the present invention.
Figure 1B:
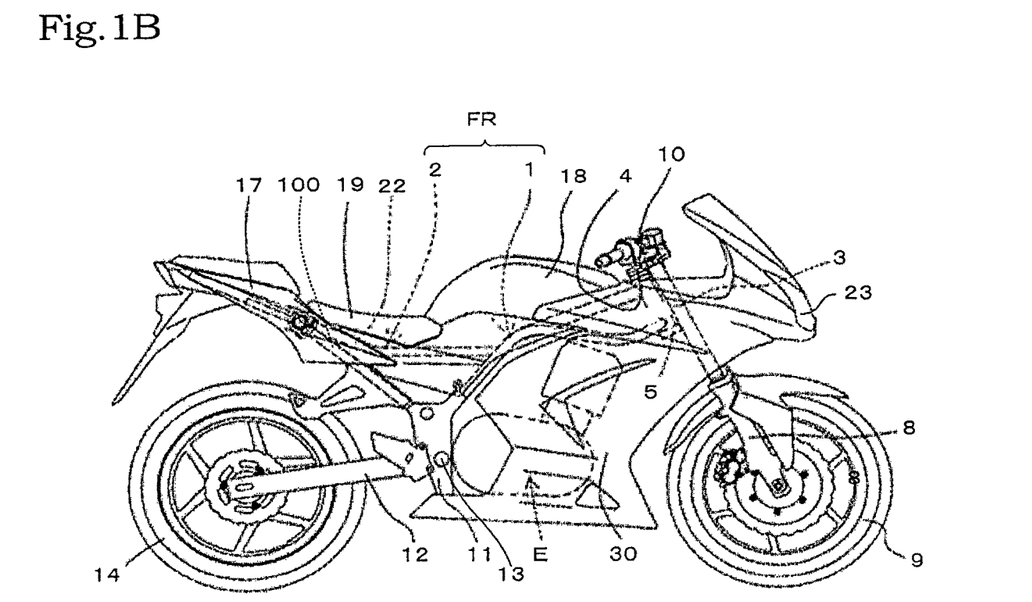
FIG. 1B is a right side view of the motorcycle as the saddle type vehicle according to the embodiment of the present invention.

FIG. 1A is a left side view of a motorcycle as a saddle type vehicle according to an embodiment of the present invention, and FIG. 1B is a right side view of the motorcycle. Front, rear, left, and right directions in FIGS. 1A and 1B as well as the respective drawings to be referred to later indicate front, rear, left, and right directions from a rider on the motorcycle, respectively, and positions ahead of and behind the vehicle will be referred to as simply "ahead" and "behind", respectively, in the present description.

The motorcycle includes a vehicle frame FR having a main frame 1 configuring a front half, and a rear frame 2 coupled to a rear end of the main frame 1 and configuring a rear half of the vehicle frame FR. The main frame 1 has a front end provided with a head pipe 3, and a steering shaft (not depicted) is rotatably inserted through the head pipe 3. The steering shaft is provided with an upper bracket 4 and an under bracket 5. The upper bracket 4 and the under bracket 5 support a front fork 8. The front fork 8 has a lower end supporting a front wheel 9, and the upper bracket 4 at an upper end of the front fork 8 is provided with a steering 10.

The main frame 1 has a rear end provided with a swing arm bracket 11. The swing arm bracket 11 vertically swingably supports a swing arm 12 via a pivot shaft 13 inserted through a front end of the swing arm 12. The swing arm 12 has a rear end supporting a rear wheel 14. The motorcycle includes a rear suspension (denoted by reference sign RS in FIG. 5) configured to restrain swing displacement of the swing arm 12. The rear suspension couples the swing arm 12 and the vehicle frame FR with a spring property and an attenuation property. As to be detailed later, the vehicle frame FR is provided with a bracket (denoted by reference sign 26 in FIG. 5) coupling the rear suspension and the vehicle frame FR. This bracket supports an air cleaner with a damper (denoted by reference sign 83 in FIG. 5) interposed therebetween.

The main frame 1 and the swing arm bracket 11 support an engine E. The engine E is configured as a water cooled 2-cylinder 4-cycle engine or the like, and drives the rear wheel 14 via a power transmission mechanism 16 such as a chain. The engine E of the motorcycle according to the present embodiment includes combustion cylinders (cylinders) disposed above a crankcase accommodating a crank shaft. The combustion cylinders each have a rear portion provided with an intake port and a front portion provided with an exhaust port. As to be described below, the engine E is disposed below a fuel tank 18. The air cleaner (see FIG. 2) is positioned vertically between the fuel tank 18 and a bottom of the crankcase. The air cleaner has a front end positioned ahead of rear ends of the crankcase and the fuel tank 18.

At an upper portion of the main frame 1, in other words, at an upper portion of the vehicle, the fuel tank 18 and a rider seat 19 are arrayed in the mentioned order behind the steering 10. Out of these components, the fuel tank 18 is fixed to the main frame 1. The remaining rider seat 19 is fixed to a pair of left and right seat frames 21 and 22 of the rear frame 2. The rear frame 2 includes, in addition to the seat frames 21 and 22, a pair of left and right reinforcing frames 100 and 101. The pair of left and right reinforcing frames 100 and 101 is disposed behind the seat frames 21 and 22. The reinforcing frames 100 and 101 has front portions connected to the main frame 1 and rear portions connected to rear portions of the seat frames 21 and 22. The front portions of the reinforcing frames 100 and 101 are disposed below front portions of the seat frames 21 and 22. The reinforcing frames 100 and 101 slant upward to be vertically closer to the seat frames 21 and 22 from the front portions toward the rear portions. The main frame 1 extends anteroposteriorly and is provided with a connecting portion (not depicted) vertically connecting the front portions of the seat frames 21 and 22 and the front portions of the reinforcing frames 100 and 101. The connecting portion of the main frame 1, the seat frames 21 and 22, and the reinforcing frames 100 and 101 can thus form a triangular frame in a side view. This configuration achieves reduction in thickness and improvement in rigidity of the rear frame 2.

The connecting portion of the main frame 1 according to the present embodiment slants backward from the upper portion toward the lower portion. The connecting portion of the main frame 1 slants also laterally outward from the upper portion toward the lower portion. The reinforcing frames 100 and 101 are thus disposed laterally outside the front portions of the seat frames 21 and 22. The main frame 1 includes a pair of left and right portions having lower positions laterally coupled to each other by a suspension support frame (denoted by reference sign SSF in FIG. 5) extending laterally. For example, the suspension support frame is disposed adjacent to the front portions of the reinforcing frames 100 and 101. The suspension support frame has an intermediate portion in the vehicle width direction swingably supporting an upper end of the rear suspension. The rear frame 2 includes a coupling frame (not depicted) coupling the pair of left and right seat frames 21 and 22. The coupling frame is disposed above and apart from an upper surface of the air cleaner.

There is provided, below and behind the rider seat 19, with a rear fender 50 (see FIG. 2) covering partially the rear wheel 14 from above. The rear fender 50 is fixed to the rear frame 2 via a rear fender fixing bracket 25 (FIG. 2) firmly fixed to the rear frame 2.

The rear fender 50 is a covering member at least partially covering the rear wheel 14 from above. The rear fender 50 thus provided prevents any matter, which has adhered to the rear wheel and is dispersed due to rotational force of the rear wheel, from hitting the rider and entering a vehicle interior space. The rear fender 50 covers the vehicle frame FR from therebehind and therebelow, and can thus be configured as a designed component preventing exposure of the vehicle frame FR. The rear fender 50 extends laterally between the pair of left and right reinforcing frames as well as extends anteroposteriorly. This configures a bottom surface of an accommodation space defined laterally inside the rear frame 2. The accommodation space according to the present embodiment accommodates vehicle components including a battery, in-vehicle tools, and electrical components such as an engine control device. The rear fender 50 has a section vertical to the anteroposterior direction formed in a substantially groove-like box shape, and includes a bottom wall forming portion extending anteroposteriorly, and a pair of left and right upright wall forming portions extending upward from respective lateral sides of the bottom wall forming portion. The bottom wall forming portion according to the present embodiment has a front region having a curved surface along an upper surface of the rear wheel 14 and an upwardly sunk (recessed) shape. This configuration prevents interference between the rear fender 50 and the rear wheel 14 due to an upward swing of the swing arm 12 and allows the rear fender 50 to be disposed at a lower position.

The rear fender 50 has a fender facing portion facing a cleaner container (denoted by reference sign 63 in FIG. 3) from therebehind. The fender facing portion according to the present embodiment is positioned above a lower surface of the cleaner container and below an upper surface of the cleaner container. The fender facing portion is provided laterally inside the seat frames 21 and 22 and extends laterally along the rear surface of the cleaner container. The rider seat 19 has a lower portion laterally covered with a side cover 17, and a vehicle front portion is provided with a front cowl 30. The front cowl 30 has a head lamp unit 23 mounted thereto. The air cleaner is fixedly disposed between the engine E and the rear frame 2 in the following manner. A configuration, a mounted position, and a fixing structure of the air cleaner will be described below in detail with reference to FIGS. 2 to 5.

Figure 2:
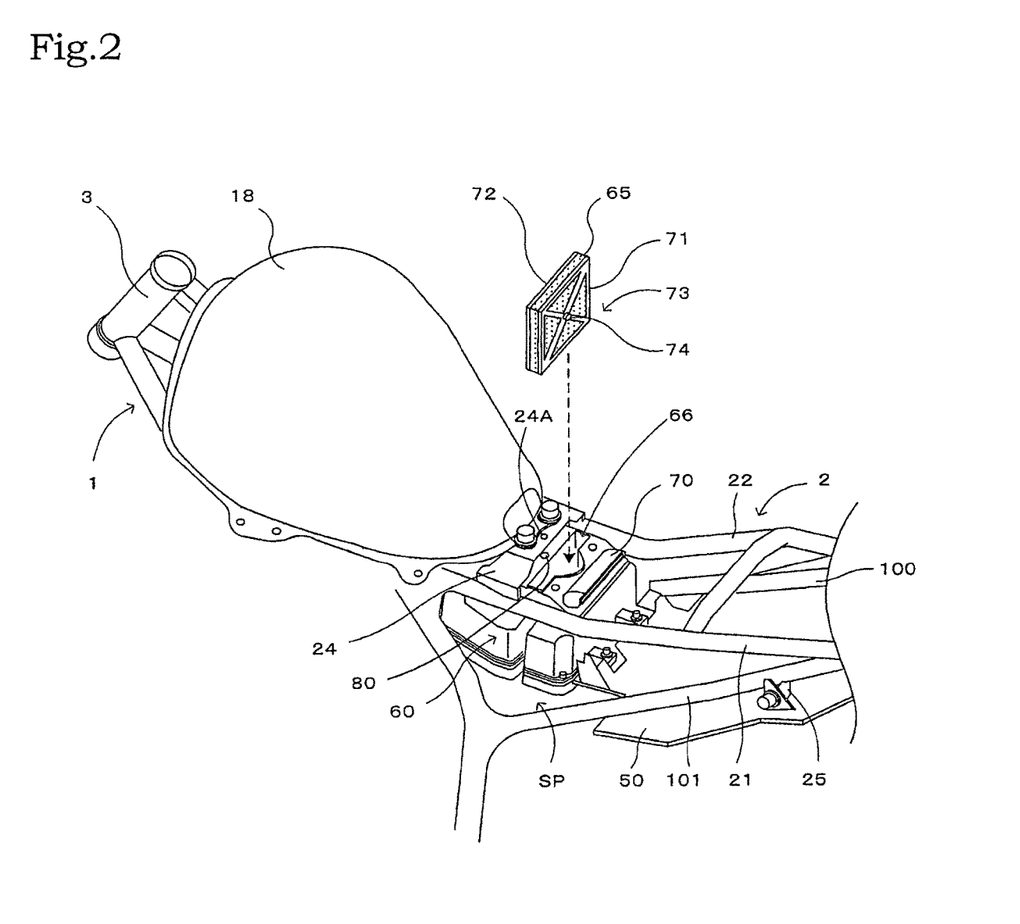
FIG. 2 is a perspective view depicting positional relations among a vehicle frame, an air cleaner, a rear fender, and a fuel tank.
Figure 3:
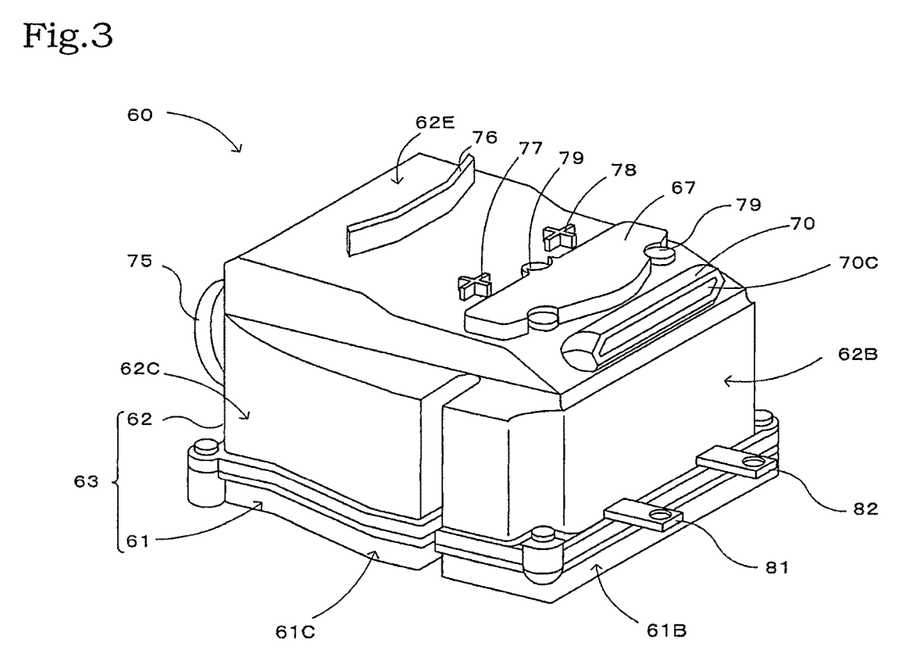
FIG. 3 is a perspective view depicting an outer structure of the air cleaner.
Figure 4:
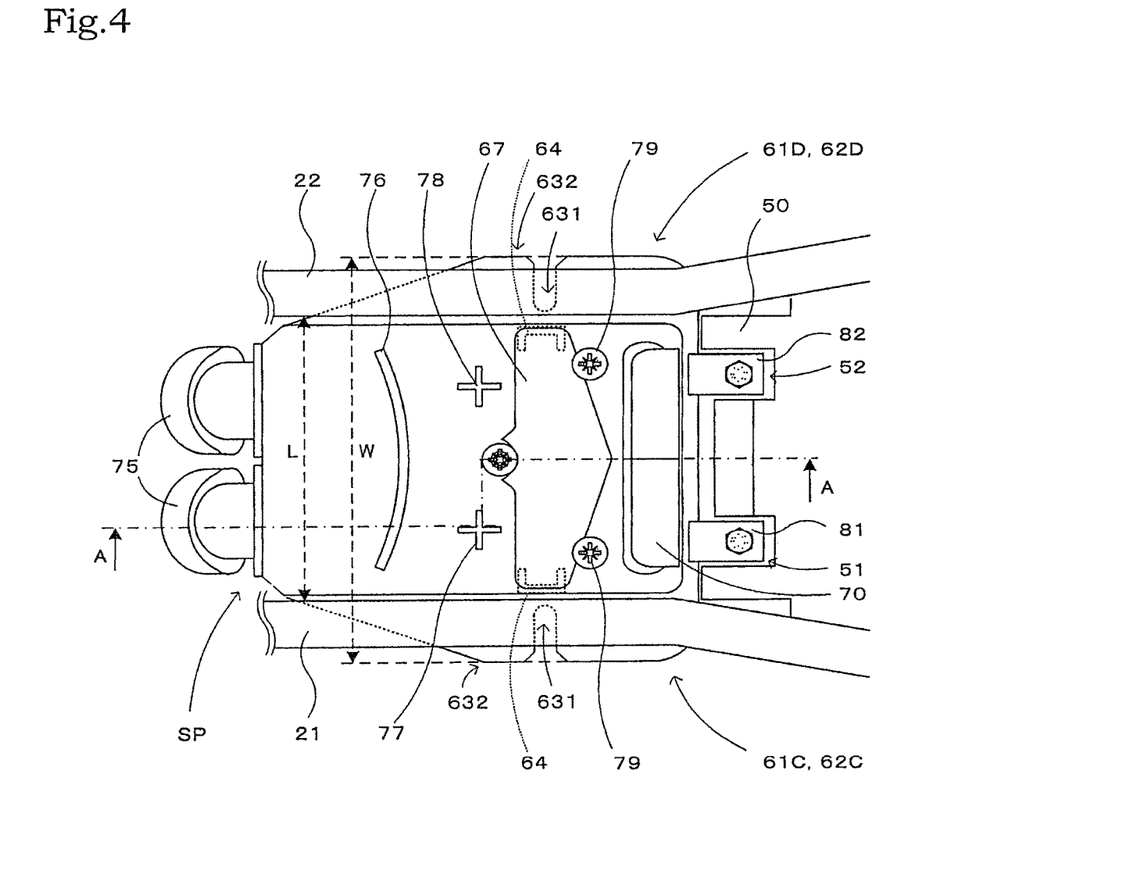
FIG. 4 is a plan view from above, of the air cleaner.
Figure 5:
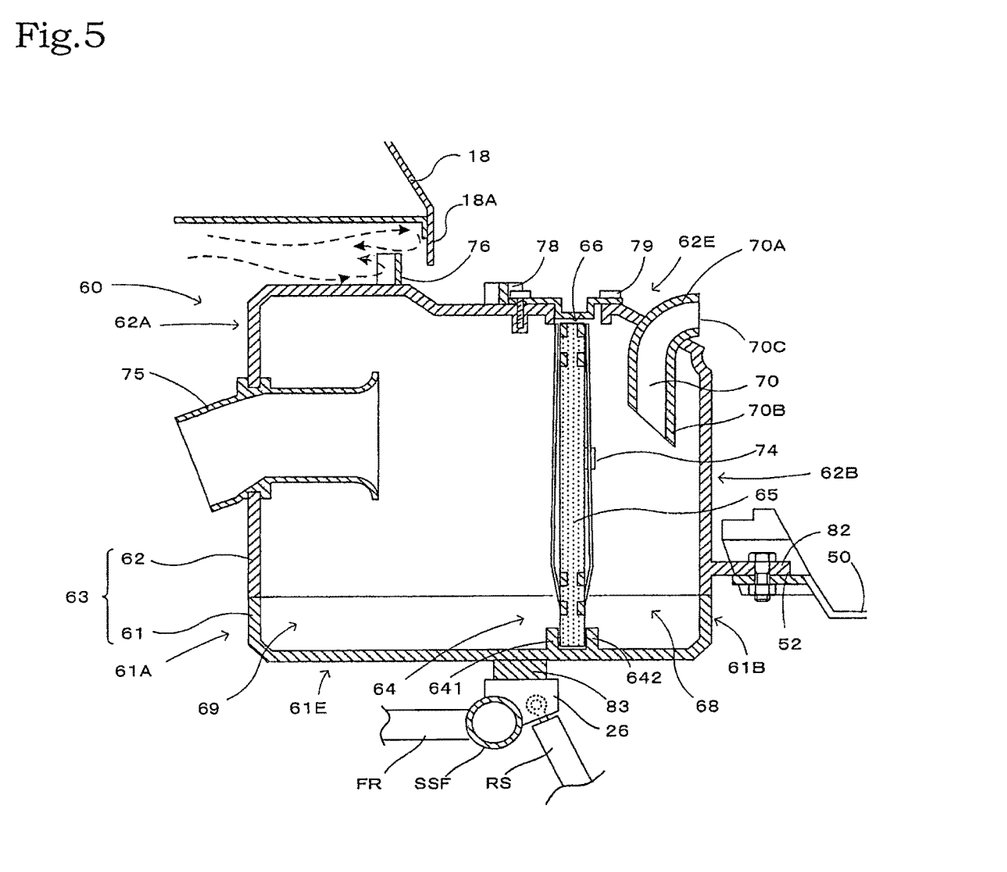
FIG. 5 is a sectional view taken along line A-A indicated in FIG. 4.

FIG. 2 is a perspective view depicting positional relations among the vehicle frame, the air cleaner, the rear fender, and the fuel tank. FIG. 3 is a perspective view depicting an outer structure of the air cleaner. FIG. 4 is a plan view from above, of the air cleaner. Furthermore, FIG. 5 is a sectional view taken along line A-A indicated in FIG. 4. FIGS. 2, 4, and 5 appropriately exclude the fuel tank 18, the rider seat 19, a filter element replacement cap, or the like, for easier comprehension of an internal structure and the fixing structure of the air cleaner. Each portion is depicted with emphasis or simplification in dimension or the number thereof as necessary, for easier comprehension.

As depicted in FIG. 2, the motorcycle according to the present embodiment is provided, adjacent to the pair of left and right seat frames 21 and 22 as constituents of the rear frame 2, with a cleaner accommodation space SP for accommodating an air cleaner 60. As depicted in FIG. 4, the pair of seat frames 21 and 22 extends while being away to each other diagonally backward and upward from above a rear end of the air cleaner 60 disposed in the cleaner accommodation space SP. Specifically, the pair of left and right seat frames 21 and 22 expands in the vehicle width direction and the vertical direction toward the rear ends, and the cleaner accommodation space SP has a rear portion opened in a horn shape when viewed from the cleaner accommodation space SP. In a state where the rear fender 50 is not mounted, the air cleaner 60 configured as described below is easily installed to and detached from the cleaner accommodation space SP.

The air cleaner 60 includes the cleaner container 63 having a lower housing 61 and an upper housing 62 integrated together to have outer appearance in a substantially rectangular parallelepiped shape, a filter element 65 accommodated in a filter accommodating portion 64 provided inside the cleaner container 63, and a lid 67 closing an opening 66 allowing the filter element 65 to be installed and detached.

The lower housing 61 is a box having an upper opening, and includes a front wall 61A oriented on the front side, a rear wall 61B oriented on the rear side, a right wall 61C oriented on the right side of the vehicle, a left wall 61D oriented on the left side of the vehicle, and a bottom surface 61E oriented on the lower side of the vehicle. The upper housing 62 is a box having a lower opening, and includes a front wall 62A oriented on the front side, a rear wall 62B oriented on the rear side, a right wall 62C oriented on the right side of the vehicle, a left wall 62D oriented on the left side of the vehicle, and an upper surface 62E oriented on the upper side of the vehicle. Peripheries of the openings are made in contact with each other such that the opening of the lower housing 61 is closed by the upper housing 62, and are fixed by bolts at a plurality of locations to form the cleaner container 63.

As depicted in FIG. 5, the cleaner container 63 is provided therein, at a position displaced backward from the center, with the filter accommodating portion 64 for the filter element 65. The filter element 65 accommodated in the accommodating portion 64 partitions the interior of the cleaner container 63 into an introduction space 68 for intake air and a guide space 69 guiding intake air having passed through the filter element 65 toward the engine E. Out of these spaces, the introduction space 68 is configured to introduce outside air as intake air through an intake duct 70 attached to a rear portion of the upper surface 62E of the upper housing 62. As depicted in FIG. 5, in the present embodiment, the intake duct 70 extending upward from the cleaner container 63 like a periscope has an exposed portion 70A curved backward, and the exposed portion 70A has an open end surface 70C serving as an intake port. The open end surface 70C is directed backward in a vertical section. Accordingly, fluid containing rainwater or muddy water flying from ahead while the motorcycle is traveling merely hits a rear surface of the exposed portion 70A to be effectively prevented from entering the air cleaner 60 through the open end surface 70C and the intake duct 70. The intake duct 70 also has an end 70B which is provided opposite the exposed portion 70A and extends to the introduction space 68 to deliver intake air toward a lower portion of the introduction space 68.

The intake air thus introduced into the introduction space 68 expands in the entire introduction space 68, and flows into the guide space 69 through the filter element 65. As depicted in FIG. 2, the filter element 65 is retained integrally between element retainers 71 and 72 to configure a filter structure body 73. In a state where the rider seat 19 is detached from the seat frames 21 and 22, the filter element in the form of the filter structure body 73 is detachably accommodated in the filter accommodating portion 64 through the opening 66. The filter element 65 serves as an air filter and is a sheet body made of a foamed material such as polyurethane foam or nonwoven fabric and configured to filtrate foreign matter. The element retainers 71 and 72 are dedicated members interposing the filter element 65 from behind and ahead of the filter element to prevent deformation thereof. As depicted in FIGS. 2 and 4, the opening 66 partially bulges backward to allow a mechanic to insert a hand to the bulging portion to easily install and detach the filter element 65. In order to prevent erroneous insertion of the filter structure body 73, the rear element retainer 71 according to the present embodiment has a projection 74 projecting from a substantial center. Even in a case where the filter structure body 73 is to be inserted with the element retainer 71 being directed forward, the projection 74 interferes with the upper surface 62E of the upper housing 62. This previously prevents erroneous insertion. The present embodiment thus provides the measure for preventing erroneous insertion of the filter element 65. These points will be described in more detail. A portion where the filter element 65 and the air cleaner 60 are adjacent to each other is configured to be anteroposteriorly asymmetric. Specifically, in the state of being accommodated in the filter accommodating portion 64, the filter element is provided with the projection to be anteroposteriorly asymmetric, more specifically, is provided with the projection at either one of front and rear ends in a planar view. The opening 66 provided at the upper housing has different anteroposterior gap dimensions from the accommodated filter element 65. Specifically, relatively to anteroposterior projection amounts of the element retainers 71 and 72, the opening 66 and a first one of the front and rear ends of the filter element form a larger gap whereas the opening 66 and a second one of the front and rear ends of the filter element form a smaller gap. In a case where the filter element 65 is inserted reversely in the anteroposterior direction, the projection 74 interferes with the opening 66 to prevent the filter element 65 from being inserted reversely in the anteroposterior direction. The present embodiment achieves an erroneous assembly preventing function by differentiating the shapes between the front and rear ends of the opening 66 and an insertion region of the filter element 65. The present invention can alternatively provide a different structure. For example, front and rear portions can be differentiated in shape in an engagement structure between the filter accommodating portion 64 and the filter element 65.

If the engine E is driven and receives intake air from the air cleaner 60 in a state where the filter element 65 is appropriately accommodated in the filter accommodating portion 64, the air cleaner 60 has negative internal pressure to atmospheric pressure. Accordingly, outside air flows into the introduction space 68 and passes through the filter element 65 as described above. The filter element 65 removes dirt, dust, impurities, and the like from the outside air (purification). Purified outside air then flows into the guide space 69 and is supplied to the engine E through an intake duct 75 and a throttle body 44 (FIG. 1). As depicted in FIG. 5, the intake duct 75 penetrates the front wall 62A of the upper housing 62.

As depicted in FIGS. 4 and 5, the upper surface 62E of the upper housing 62 has an upright wall 76 provided ahead of the intake port (open end surface 70C) of the air cleaner 60. The wall 76 serves as a so-called baffle plate configured to disturb fluid flowing from ahead from reaching the intake port. As depicted in FIG. 5, the wall 76 is disposed ahead of a wall 18A extending vertically downward from the lower surface of the fuel tank 18 and has an upper end above a lower end of the wall 18A. The walls 76 and 18A cooperatively form a labyrinth structure in this manner. The labyrinth structure reverses fluid flowing from ahead between the lower surface of the fuel tank 18 and the upper surface of the air cleaner 60. This effectively prevents fluid from flowing to the intake port. As depicted in FIG. 5, the wall 76 is provided ahead of the wall 18A in a facing region where the upper surface of the air cleaner 60 and the lower surface of the fuel tank 18 face each other in the present embodiment. The relations between the two components can alternatively be inverted within the range of the facing region. Moreover, the walls 76 and 18A can appropriately be provided in terms of their numbers, and either one of these can include a plurality of walls.

The upper surface 62E of the upper housing 62 is provided with a pair of left and right projections 77 and 78. The projections 77 and 78 face an elastic member (not depicted) provided above the air cleaner 60, so as to allow upper ends of the projections 77 and 78 to come into contact with the elastic member when the air cleaner 60 is displaced upward beyond an allowable range. This restricts upward displacement of the air cleaner 60. The elastic member thus serves as a "restricting member" according to the present invention. The projections 77 and 78 and the elastic member can alternatively be replaced in terms their positional relations.

As depicted in FIG. 2, the upper surface 62E of the upper housing 62 is provided, around the opening 66 allowing the filter structure body 73 to be installed and detached, with attachment holes for the lid 67. As depicted in FIGS. 3 and 4, the opening 66 is covered with the lid 67 and screws 79 are screwed to the attachment holes to attach the lid 67 to the air cleaner 60, to prevent outside air from flowing into the air cleaner 60 through the opening 66. Three attachment holes include an attachment hole 80 provided ahead of the opening 66 and positioned below a cross member 24 for fixing the fuel tank 18, as depicted in FIG. 2. The cross member 24 according to the present embodiment is provided, at a position facing the attachment hole 80, with a through hole 24A. Such a configuration thus adopted enables the lid 67 to be screwed to the attachment hole 80 with use of the through hole 24A.

The lid 67 can optionally be provided with a knob disposed vertically apart from the air cleaner 60 in a state where the lid 67 is attached to the air cleaner 60. Provision of such a knob allows the lid 67 to be detached easily from the air cleaner 60. According to the present embodiment, the lid 67 has a plate shape and an upper surface portion of the air cleaner 60 facing the knob slants downward from the remaining upper surface portion. This configuration simplifies the shape of the flat lid 67 and allows the knob to be separated above from the upper surface of the air cleaner 60.

As depicted in FIGS. 3 to 5, the rear wall 62B of the upper housing 62 is provided with two fixing ends 81 and 82 projecting backward. These two fixing ends 81 and 82 are positioned to face fixed portions 51 and 52 provided at the front end of the rear fender 50 fixed to the rear frame 2. The fixing ends 81 and 82 are provided with bolt through holes upon molding the upper housing 62. The rear fender 50 according to this embodiment is formed into the desired shape by molding a resin material similarly to main components of the air cleaner 60. Specifically, the rear fender 50 is molded integrally with the portion covering the rear wheel 14 from above and the fixed portions 51 and 52. The fixed portions 51 and 52 are thus provided with the bolt through holes.

As depicted in FIG. 5, the bottom surface 61E of the lower housing 61 is provided with a vibration preventing damper 83. As to be described next, when the air cleaner 60 is accommodated in the cleaner accommodation space SP, the damper 83 comes into contact with the bracket 26 firmly fixed to the vehicle frame FR. The air cleaner 60 is thus supported by the vehicle frame FR via the damper 83.

Described next is the fixing structure of the air cleaner 60 as described above. As described earlier, the cleaner accommodation space SP has a rear extending region largely opened backward. According to the present embodiment, the air cleaner 60 is thus inserted from behind to the cleaner accommodation space SP in the state where the rear fender 50 is not mounted. As described above, the bottom surface (61E) of the air cleaner 60 is then supported from below by the vehicle frame FR via the damper 83. Furthermore, the intake duct 75 is connected, specifically, clamped to the throttle body 44 (FIGS. 1A and 1B) of the engine E to support the air cleaner 60 from ahead.

After the air cleaner 60 is inserted to the cleaner accommodation space SP, the rear fender 50 is fixed to the rear frame 2 and the air cleaner 60 is fixed to the rear fender 50. Specifically, the rear fender 50 is fixed by a bolt to the rear fender fixing bracket 25, to fix the rear fender 50 to the rear frame 2. FIG. 2 depicts how the rear fender is fixed on the left side of the vehicle. The rear fender 50 is fixed to the rear frame 2 similarly on the right side of the vehicle. In other words, the rear fender 50 is fixed to the rear frame 2 at the pair of left and right portions. The rear frame 2 is thus provided with the rear fender fixing brackets 25 at distant positions laterally outside the air cleaner 60. This configuration prevents interference of the fixing brackets 25 to allow the air cleaner 60 to be inserted. Meanwhile, as to the air cleaner 60, the fixing ends 81 and 82 are disposed on the fixed portions 51 and 52 of the rear fender 50 to be overlapped, a bolts is inserted through the through holes of the fixed portion 51 and the fixing end 81 to be fixed, and a bolt is inserted through the through holes of the fixed portion 52 and the fixing end 82 to be fixed. The air cleaner 60 is thus fixed to the rear fender 50 at the two left and right positions. As depicted in FIG. 4, these fixed positions according to the present embodiment are located inside the pair of left and right seat frames 21 and 22, and the air cleaner 60 is fixed at the positions close in the vehicle width direction to the position where the air cleaner 60 is connected to the throttle body 44.

The embodiment of the above configuration achieves the following functional effects.

According to the present embodiment, the fixing ends 81 and 82 of the air cleaner 60 are coupled to the fixed portions 51 and 52 of the rear fender 50 to directly fix the air cleaner 60 to the rear fender 50. This prevents influence by a frame error (a welding error or a shape error) to inhibit positional variation between the air cleaner 60 and the rear fender 50. The fixing structure thus adopted does not need fixation of the air cleaner 60 to the vehicle frame FR or provision of an air cleaner fixing bracket to the vehicle frame FR, to reduce the number of frame brackets and achieve cost reduction.

The positional relation between the air cleaner 60 and the rear fender 50 can be defined accurately with free from influence of a frame error, to set a small clearance between the air cleaner 60 and the rear fender 50, for example. As depicted in FIGS. 4 and 5, the rear ends of the fixing ends 81 and 82 and the front ends of the fixed portions 51 and 52 are overlapped with each other and the overlapped portions are coupled. This configuration allows the front end of the rear fender 50 to be located close to the air cleaner 60 to effectively narrow the clearance. This configuration prevents entry of heat to the air cleaner 60 through the gap between the air cleaner 60 and the rear fender 50. As depicted in FIG. 5 and the like, the intake port (open end surface 70C) of the air cleaner 60 is positioned immediately above the gap particularly in the present embodiment. This configuration narrows the gap, or reduces the clearance, to favorably inhibit influence by heat. In the case where the accommodation space is provided on the rear fender 50, any accommodated component (e.g., a bolt or a coin) disengaged in the accommodation space can be prevented from falling through the gap between the rear fender 50 and the air cleaner 60.

The air cleaner 60 according to the present embodiment is fixed at the fixed portions of the rear fender 50. The fixed portions are formed integrally upon molding the rear fender 50. This configuration achieves reduction in the number of locations welded to the vehicle frame and reduction in production cost in comparison to the case of providing, by welding, the vehicle frame, with the brackets for fixation of the air cleaner 60 (corresponding to the "fixed portions").

The embodiment described above provides the rear fender 50 made of a resin material to allow the rear fender 50 to attenuate vibration transmitted from the vehicle frame FR and inhibit vibration transmitted to the air cleaner 60. This configuration thus reduces vibration of the air cleaner 60.

The air cleaner 60 according to the above embodiment is fixed to the rear fender 50 as well as is supported by the vehicle frame FR via the damper 83. This achieves stable fixation of the air cleaner 60 without excessive rigidity of the fixing portions of the air cleaner 60 provided at the rear fender 50, i.e., the fixing ends 81 and 82. The damper 83 serves as a shock absorbing member to achieve reduction in amount of vibration transmitted from the vehicle frame to the air cleaner 60. This further improves stability of the fixed air cleaner 60.

The above embodiment provides the restricting member (elastic member) restricting upward displacement of the air cleaner 60, to inhibit upward displacement of the air cleaner 60 for further improvement in stability of the fixed air cleaner 60.

The air cleaner 60 is fixed at the plurality of positions in the direction vertical to an anteroposterior axis to inhibit rotational displacement about the anteroposterior axis of the air cleaner.

The lower end of the air cleaner 60 is supported at the anteroposterior intermediate portion (of the vehicle frame FR), to achieve displacement restriction at the front end of the air cleaner 60 (the throttle body 44), the rear end of the air cleaner 60 (the rear fender 50), and the anteroposterior intermediate portion of the air cleaner 60 (the vehicle frame FR) for stable support.

The upper end of the air cleaner 60 is disposed between the pair of left and right seat frames 21 and 22. This configuration also prevents lateral displacement of the air cleaner 60. Displacement of the air cleaner 60 upward, downward, leftward, rightward, forward, and backward is restricted by the members other than the rear fender 50, specifically, the throttle body 44, the vertical vehicle frame FR, and the seat frames 21 and 22. This configuration reduces the fixing install of the rear fender 50.

The position of connection to the throttle body 44 and the position of the damper are set laterally between the left and right fixed positions to the rear fender 50. This configuration avoids linear alignment of three or more displacement restricting positions for stable support.

One of the housings 61 and 62 divided vertically is provided with the plurality of fixing ends 81 and 82 to be fixed to the rear fender 50, to prevent displacement of the fixing ends 81 and 82 more effectively in comparison to a case where each of the upper and lower housings 61 and 62 is provided with a plurality of rear fender fixing ends (corresponding to the fixing ends 81 and 82). The fixing ends 81 and 82 provided at the vertically intermediate positions on the rear fender 50 do not need the rear fender 50 to be extended to the lower end of the air cleaner 60 and thus prevents increase in size of the rear fender 50.

The rear fender 50 is provided, at the fixing portions with the air cleaner 60, with the bottom surface and the respective lateral sides projecting upward from the lateral sides of the bottom surface and extending anteroposteriorly, and is thus less likely to be deformed. The rear fender 50 according to the present embodiment is further provided with a vertically projecting rib laterally between the respective lateral sides and the fixed positions with the air cleaner, and is thus further less likely to be deformed. This configuration thus achieves easier support of the air cleaner 60. The rear fender 50 is preferably provided, at the front portion, with a fixing portion to be fixed to the vehicle frame FR. This configuration will thus inhibit deformation of the front portion of the rear fender 50 due to support of the air cleaner 60.

The fixed positions between the rear fender 50 and the air cleaner 60 are located laterally inside the respective lateral sides of the rear fender 50, to prevent the fixing bolts from being laterally exposed for better quality in outer appearance of the vehicle. A bolt fastening direction is set to the vertical direction to allow the rear fender 50 and the air cleaner 60 to be fixed together while preventing interference between the respective lateral sides and a tool.

The upper housing 62 has a disengaging direction set to the vertical direction. The fixing ends 81 and 82 of the air cleaner 60 have the vertical through holes to achieve easy formation of the fixing portions upon molding in comparison to a case where the through holes of the fixing ends extend laterally.

The fixing bolts are provided thereabove with another in-vehicle component, specifically, a battery case. This configuration prevents any loosened fixing bolt from disengaging from the rear fender 50 having a screw hole.

As depicted in FIG. 5, the air cleaner 60 is supported from below by the suspension support frame SSF, with no need to provide any dedicated vehicle frame FR and any bracket for support of the air cleaner 60 from below to achieve reduction in the number of components. The suspension support frame SSF has a suspension support portion (the bracket 26) supporting the air cleaner 60 mounted thereon. The rear suspension RS is disposed at the center in the vehicle width direction, so that the air cleaner 60 is stably supported at the center in the vehicle width direction.

The above embodiment provides the labyrinth structure located ahead of the intake port (open end surface 70C) of the air cleaner 60. This structure effectively prevents fluid containing rainwater or muddy water flying from ahead from reaching the intake port while the motorcycle is traveling, and thus effectively prevents rainwater, muddy water, or the like from entering the air cleaner 60 through the intake port. Furthermore, provision of the labyrinth structure at part of the fuel tank 18 achieves reduction in the number of components in comparison to a case of providing a dedicated member. Specifically, the wall 18A serves as a joint generated due to welding connection between the upper surface portion and the lower surface portion of the fuel tank 18, where the upper surface portion and the lower surface portion are anteroposteriorly overlapped with each other. The wall 18A is inevitably provided upon welding a tank, and this joint is included as part of the labyrinth structure. This achieves reduction in the number of components.

Furthermore, the wall 18A is curved to bulge backward along the rear surface shape of the tank. The air cleaner 60 is provided with a wall 76A that is curved to bulge backward similarly to the wall 18A. This configuration prevents partial increase in distance in the anteroposterior direction between the wall 76A at the air cleaner and the wall 18A at the tank, and improves the effect of preventing backward displacement of foreign matter.

The portion ahead of the wall 76A at the air cleaner projects upward from the portion behind the wall 76A, to achieve increase in volume of the air cleaner and reduction in amount of projection of the wall 76A from the body of the air cleaner 60. The wall 76A according to the present embodiment is provided ahead of the cross member 24 supporting the fuel tank 18, to prevent interference with the cross member 24 and achieve increase in vertical dimension of the wall 76A and improvement in effect of preventing backward displacement of foreign matter.

As the air cleaner 60 is provided thereahead with a radiator (not depicted) and the engine E, hot air may flow between the fuel tank 18 and the upper surface of the air cleaner 60. The labyrinth structure inhibits backward displacement of the hot air. This feature is common in that the clearance between the rear fender 50 and the air cleaner 60 can be reduced to inhibit upward displacement of hot air through the gap between the radiator and the air cleaner 60.

The wall 76A provided at the air cleaner 60 is disposed ahead of the fuel tank 18 to prevent interference between a tank fixing portion and the wall 76A. This configuration prevents exposure of the wall 76A to improve quality in outer appearance in a case where the rider seat is detached and prevents decrease in size of the space below the rider seat.

Furthermore, the cleaner accommodation space SP according to the above embodiment is provided below the rider seat 19. The cleaner accommodation space SP according to the present embodiment partially includes a region above the seat frames 21 and 22. The cleaner accommodation space SP has a region ahead of the reinforcing frames and a region ahead of a portion of the vehicle frame connecting the front portions of the seat frames 21 and 22 and the front portions of the reinforcing frames. The vehicle frame is disposed except for the backward extending region of the cleaner accommodation space SP. Specifically, the seat frames 21 and 22, the reinforcing frames, the coupling frame, and the suspension support frame FRS are disposed at positions distant from the extending region. Furthermore, the vehicle frame FR is disposed apart from the extending region in upper, lower, left, and right directions. This configuration prevents interference between the air cleaner 60 and the frame upon installing and detaching the air cleaner 60 to and from the cleaner accommodation space SP, to facilitate the tasks of installing and detaching the air cleaner 60. The vehicle frame FR is provided with no bracket for the air cleaner, so that the air cleaner 60 is inserted from behind to the cleaner accommodation space SP while interference of the air cleaner 60 to the pair of left and right frames 21 and 22 is prevented.

As depicted in FIG. 4, the right walls 61C and 62C and the left walls 61D and 62D are bulged outward from the pair of left and right frames 21 and 22 and have a maximum lateral width W larger than a distance L between the pair of left and right frames 21 and 22, to achieve increase in body capacity of the air cleaner 60. A similar functional effect will be achieved in a case where either the right walls or the left walls are bulged. The filter element 65 according to the present embodiment is installed to and detached from the filter accommodating portion 64 through the gap between the frames 21 and 22. Accordingly, in a planar view from vertically above as depicted in FIG. 4, a wall portion corresponding to the filter accommodating portion 64 in a wall of the cleaner container 63 is disposed below the pair of left and right frames with respect to the walls 61C, 62C, 61D, and 62D. This configuration achieves reduction in amount of a resin material necessary for production of the cleaner container 63 and thus achieves reduction in weight of the air cleaner 60. As depicted in FIG. 4, the wall of the cleaner container 63 has an outer wall portion 631 corresponding to the accommodation portion, positioned laterally outside a portion provided with the filter accommodating portion 64 and a remaining outer wall portion 632. The outer wall portion 631 corresponding to the accommodating portion is sunk laterally inward from the remaining outer wall portion 632. In other words, the portion 631 corresponding to the accommodation portion is laterally smaller than the remaining portion 632. Even in a case where the filter accommodating portion 64 provided relatively laterally inside is molded integrally, the outer wall portion 631 corresponding to the accommodation portion of the cleaner container 63 is prevented from becoming thicker and is thus prevented from being deteriorated in moldability. Also in a case where the filter accommodating portion 64 is not molded integrally with the cleaner container 63, the outer wall portion 631 corresponding to the accommodation portion is laterally sunk with respect to the remaining portion 632 to achieve easier formation of a seat projecting inward in the vehicle width direction for support of the filter accommodating portion 64 disposed relatively laterally inside.

The filter accommodating portion 64 also serves as a guide preventing displacement of the filter structure body 73 in directions other than the vertical direction. In a state where the cleaner container 63 accommodates the filter element 65, the filter accommodating portion 64 has a forward displacement preventive portion 641 facing from ahead the lower end and the left and right ends of the front surface of the filter element 65, and a backward displacement preventive portion 642 facing from behind the lower end and the left and right ends of the rear surface of the filter element 65. The displacement preventive portions 641 and 642 form an anteroposterior gap accommodating the filter element 65. This prevents anteroposterior displacement of the filter element 65. The displacement preventive portions 641 and 642 are opened upward. The filter element 65 being accommodated is thus displaceable upward relatively to the cleaner container 63 so as to be installed thereto and detached therefrom. The filter accommodating portion 64 has a portion molded integrally with the upper housing 62 and a portion molded integrally with the lower housing 61. This configuration achieves simultaneous molding of the filter accommodating portion 64 and the housings 61 and 62 to achieve reduction in production cost.

In a state where the cleaner container 63 is mounted on the vehicle, the filter accommodating portion 64 has a portion positioned inside in the vehicle width direction laterally inner edges of the pair of left and right seat frames 21 and 22. The filter element 65 is thus installed and detached laterally inside the seat frames 21 and 22 to prevent interference between the frames 21 and 22 and the filter element 65. In other words, the filter structure body 73 has the lateral dimension set to be not more than that of the pair of left and right seat frames 21 and 22, to be accommodated in the cleaner container 63 with no interference with the seat frames 21 and 22.

Furthermore, the rider seat 19 is detachably provided, and the cleaner accommodation space SP is exposed upward in the state where the rider seat 19 is detached from the vehicle. The opening 66 is thus exposed by simply detaching the seat with easier attachment and detachment of an element in comparison to a case where the element is attached and detached with a side cowl and the fuel tank 18 being detached.

The present invention is not limited to the embodiment described above, but various changes other than those described above are applicable without departing from the gist of the invention. For example, although the present invention is applied to the motorcycle including the water cooled 2-cylinder 4-cycle engine E in the above embodiment, the present invention is not limited thereto. For example, the engine can have any number of cylinders other than two. The engine can be of a two cycle type or of an air-cooling type.

Although many components of the air cleaner 60 and the rear fender 50 are resin molded articles in the above embodiment, the present invention is not limited thereto. For example, the present invention is also applicable to a motorcycle including the rear fender 50 made of a material other than the resin material, such as a metal material. The rear fender 50 can be divided into front and rear portions. The present invention is also applicable to the rear fender 50 that also serves as a battery case. The rear fender thus includes a portion disposed between the pair of seat frames 21 and 22 and above the rear wheel 14.

The present invention is applicable not only to the motorcycle described above, but also to any saddle type vehicle operated by a person sitting on a saddle, i.e., any vehicle other than the two wheeled vehicle such as a three wheeled vehicle or an all terrain vehicle (ATV; the so-called buggy).

Although the rear fender 50 according to the present embodiment is provided as a single box-shaped member, the rear fender 50 can alternatively include a plurality of members stacked in the vertical direction. The air cleaner 60 can be fixed to any one of members in this case. Furthermore, as to a fixing method, the rear frame 2 and the rear fender 50 can be fixed to each other after the rear fender 50 and the air cleaner 60 are fixed to each other.

As described above, the damper 83 according to the above embodiment exemplifies the "shock absorbing member". The bracket 26 firmly fixed to the vehicle frame FR exemplifies the "support member". The walls 18A and 76 exemplify a "first wall" and a "second wall", respectively.

This invention is applicable to any saddle type vehicle including an air cleaner disposed behind an engine.

What is claimed is:

1. A saddle vehicle including an engine that is between a front wheel and a rear wheel and is mounted on a vehicle frame, the saddle vehicle comprising:
   a rear fender at least partially covering the rear wheel from above;
   an air cleaner between the rear fender and the engine; and
   a support member attached to the vehicle frame,
   wherein:
   the air cleaner is fixed to the rear fender,
   the support member is positioned vertically below the air cleaner that is fixed to the rear fender, and
   the air cleaner has a bottom supported by the support member with a shock absorbing member interposed therebetween.

2. The saddle vehicle according to claim 1, wherein:
   the rear fender has a fixed portion that is molded integrally with the rear fender and fixes the air cleaner, and
   the air cleaner is detachably fixed to the fixed portion.

3. The saddle vehicle according to claim 1, wherein:
   the rear fender is made of a resin material.

4. A saddle vehicle including an engine that is between a front wheel and a rear wheel and is mounted on a vehicle frame, the saddle vehicle comprising:
   a rear fender at least partially covering the rear wheel from above;
   an air cleaner between the rear fender and the engine; and
   a fuel tank configured to reserve fuel of the engine;

wherein:
the air cleaner is fixed to the rear fender, and
a labyrinth structure is positioned ahead of an intake port of the air cleaner, the labyrinth structure including a first wall projecting downward from a lower surface of the fuel tank and a second wall projecting upward from an upper surface of the air cleaner, and the labyrinth structure being configured to reverse a fluid flow from ahead between the lower surface of the fuel tank and the upper surface of the air cleaner.

5. A saddle vehicle including an engine that is between a front wheel and a rear wheel and is mounted on a vehicle frame, the saddle vehicle comprising:
a rear fender at least partially covering the rear wheel from above; and
an air cleaner between the rear fender and the engine; wherein:
the air cleaner is fixed to the rear fender,
the vehicle frame includes a pair of left and right frames, and
the air cleaner is configured to be installed and detached near the rear wheel to and from an accommodation space below the pair of left and right frames, and has a maximum lateral width which is larger than a distance between the pair of left and right frames.

6. The saddle vehicle according to claim 5, wherein:
the air cleaner includes a cleaner container having a filter accommodating portion configured to accommodate a filter element, and an opening defined in an upper surface of the cleaner container and configured to allow the filter element to be installed to and detached from the filter accommodating portion,
the filter element is configured to be installed to and detached from the filter accommodating portion through a gap between the pair of left and right frames,
in a state in which the filter element is inserted into the filter accommodating portion, the cleaner container has an interior partitioned by the filter element, into an introduction space for an intake air and a guide space configured to guide the intake air which has passed through the filter element toward the engine, and
in a planar view, the cleaner container has a wall including a wall portion that corresponds to the filter accommodating portion and is sunk laterally inward from wall portions corresponding to the introduction space and the guide space.

* * * * *